US010877335B2

(12) United States Patent
Chen

(10) Patent No.: US 10,877,335 B2
(45) Date of Patent: Dec. 29, 2020

(54) LIQUID CRYSTAL DISPLAY DEVICE AND METHOD FOR IMPROVING COLOR DIFFERENCE OF VIEWING ANGLES OF LIQUID CRYSTAL DISPLAY DEVICE

(71) Applicants: HKC CORPORATION LIMITED, Guangdong (CN); CHONGQING HKC OPTOELECTRONICS TECHNOLOGY CO., LTD., Chongqing (CN)

(72) Inventor: Yujen Chen, Shenzhen (CN)

(73) Assignees: HKC CORPORATION LIMITED, Guangdong (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 15/568,383

(22) PCT Filed: May 25, 2017

(86) PCT No.: PCT/CN2017/085977
§ 371 (c)(1),
(2) Date: Nov. 1, 2018

(87) PCT Pub. No.: WO2018/176618
PCT Pub. Date: Oct. 4, 2018

(65) Prior Publication Data
US 2019/0056615 A1 Feb. 21, 2019

(30) Foreign Application Priority Data

Mar. 30, 2017 (CN) .......................... 2017 1 0204062

(51) Int. Cl.
*G09G 3/36* (2006.01)
*G02F 1/1347* (2006.01)
(Continued)

(52) U.S. Cl.
CPC ........ *G02F 1/13476* (2013.01); *G02F 1/1334* (2013.01); *G02F 1/133504* (2013.01);
(Continued)

(58) Field of Classification Search
CPC .. G09G 3/36; G09G 3/02; G09G 5/00; G06G 3/02; G06F 3/038
See application file for complete search history.

(56) References Cited

U.S. PATENT DOCUMENTS 7,973,749 B2    7/2011  Uehara et al.
2006/0262057 A1* 11/2006  Sumiyoshi ........... G09G 3/3614
                                                345/87
(Continued)

FOREIGN PATENT DOCUMENTS

CN    101013211 A    8/2007
CN    101075040 A    11/2007
(Continued)

OTHER PUBLICATIONS

International Search Report, dated Dec. 28, 2017, for HKC Corporation Limited et al., International Application No. PCT/CN2017/085977, Filed May 25, 2017.
(Continued)

*Primary Examiner* — Pegeman Karimi
(74) *Attorney, Agent, or Firm* — Westbridge IP LLC

(57) ABSTRACT

A liquid crystal display device and a method for improving color difference of viewing angles thereof are provided. The liquid crystal display device comprises a backlight module, an LCD panel disposed on the backlight module, and a liquid crystal dimming panel disposed on the LCD panel. The LCD panel is located between the backlight module and the liquid crystal dimming panel. The LCD panel is provided with a plurality of groups of image pixel groupings arranged in a form of an array, each group of the image pixel
(Continued)

groupings comprises a plurality of image pixels, a light energy of viewing angles among liquid crystal molecules in the liquid crystal dimming panel is adjusted appropriately by controlling driving voltages of the liquid crystal dimming panel with respect to positions of different groups of image pixel groupings.

16 Claims, 5 Drawing Sheets

(51) Int. Cl.
  *G02F 1/1334* (2006.01)
  *G02F 1/13357* (2006.01)
  *G06F 3/01* (2006.01)
  *G02F 1/1335* (2006.01)
  *G09G 3/34* (2006.01)

(52) U.S. Cl.
  CPC ........ *G02F 1/133606* (2013.01); *G06F 3/013* (2013.01); *G09G 3/3406* (2013.01); *G09G 3/36* (2013.01); *G09G 3/3607* (2013.01); *G09G 3/3611* (2013.01); *G02F 2001/133562* (2013.01); *G02F 2001/133607* (2013.01); *G02F 2203/62* (2013.01); *G09G 2300/023* (2013.01); *G09G 2320/028* (2013.01); *G09G 2320/0242* (2013.01); *G09G 2320/068* (2013.01); *G09G 2320/0686* (2013.01); *G09G 2354/00* (2013.01)

(56) References Cited

U.S. PATENT DOCUMENTS

| 2007/0176887 | A1* | 8/2007 | Uehara | G02F 1/1347 345/102 |
| 2012/0249724 | A1* | 10/2012 | Morrison | G06F 3/013 348/14.16 |
| 2015/0002563 | A1* | 1/2015 | Chen | G09G 3/3406 345/697 |
| 2016/0093255 | A1* | 3/2016 | Aoki | G06F 3/0416 345/690 |
| 2019/0064559 | A1* | 2/2019 | Harada | G09G 3/3648 |
| 2019/0129257 | A1* | 5/2019 | Wang | G02F 1/133514 |

FOREIGN PATENT DOCUMENTS

| CN | 103544921 A | 1/2014 |
| CN | 103852949 A | 6/2014 |
| CN | 105487277 A | 4/2016 |
| CN | 105549236 A | 5/2016 |
| CN | 106249492 A | 12/2016 |
| KR | 101275729 B1 | 6/2013 |

OTHER PUBLICATIONS

Written Opinion, dated Dec. 28, 2017, for HKC Corporation Limited et al., International Application No. PCT/CN2017/085977, Filed May 25, 2017.

Chinese Office Action, dated Apr. 3, 2019, for HKC Overseas Limited et al., Application No. 201710204062.8.

* cited by examiner

LIQUID CRYSTAL DISPLAY DEVICE AND METHOD FOR IMPROVING COLOR DIFFERENCE OF VIEWING ANGLES OF LIQUID CRYSTAL DISPLAY DEVICE

TECHNICAL FIELD

The present application relates to the technical field of an LCD displaying device, and more particularly, relates to a liquid crystal display device and a method for improving color difference of viewing angles of the liquid crystal display device.

BACKGROUND

Currently, most large-sized LCD (Liquid Crystal Display) panels are manufactured using a negative mode VA (Vertical Alignment) liquid crystal technology or IPS (In-Plane Switching) technology. The VA liquid crystal technology has advantages of a high production efficiency and a low manufacturing cost compared with the IPS liquid crystal technology. However, in the aspect of optical properties, the VA liquid crystal technology has very obvious optical property deficiencies compared with the IPS liquid crystal technology. Moreover, in the aspect of commercial application, displaying of a larger viewing angle is particularly necessary for the large-sized liquid crystal panels, since the LCD panels adopting the VA liquid crystal technology have problems of color difference from different viewing angles, which fails to meet a market application requirement.

Generally speaking, the VA liquid technology solves a deficiency of color difference of viewing angles by further dividing each pixel in an image pixel grouping into a main pixel and a sub-pixel, and applying different driving voltages to the main pixel and the sub-pixel in space. However, it always needs to redesign metal wirings or TFT (Thin Film Transistor) components to drive the sub-pixel for this pixel design, which results in a sacrifice of light-transparent opening area. In this way, not only a penetration rate of the LCD panel is affected, but also a manufacturing cost of a backlight module is increased.

Technical Problem

A purpose of the present application is to provide a liquid crystal display device and a method for improving color difference of viewing angles of the liquid crystal display device, which aims at solving a technical problem that there exists color difference of viewing angles in the liquid crystal display device adopting VA liquid crystal technology in the prior art.

Technical Solution

In order to implement aforesaid purpose, a technical solution of the present application is that: a liquid crystal display device comprising:

a backlight module;

a LCD panel configured to be stacked on the backlight module, wherein the LCD panel is provided with a plurality of groups of image pixel groupings arranged in a form of an array, and each group of the image pixel groupings comprises a plurality of image pixels; and a liquid crystal dimming panel disposed on the LCD panel, wherein the LCD panel is positioned between the backlight module and the liquid crystal dimming panel, a light energy of viewing angles among the liquid crystal molecules in the liquid crystal dimming panel is adjusted appropriately by controlling driving voltages of the liquid crystal dimming panel with respect to positions of different groups of the image pixel groupings.

Further, the liquid crystal dimming panel is provided with a plurality of dimming pixels, the driving voltages are driving voltages of the dimming pixels on the liquid crystal dimming panels.

Furthermore, each of the dimming pixels is corresponding to each of the image pixel groupings on the liquid crystal display panel one to one.

Furthermore, each of the dimming pixels is corresponding to each of the image pixels in each image pixel grouping one to one.

Furthermore, each of the dimming pixels is corresponding to some of the image pixel groupings on the LCD panel.

Furthermore, each of two opposite surfaces of the liquid crystal dimming panel is provided with a light-transparent conductive film, and the light energy of viewing angles among the liquid crystal molecules in the liquid crystal dimming panel is adjusted appropriately by controlling the driving voltages of the liquid crystal dimming panel with respect to the positions of different groups of the image pixel groupings according to wiring of the light-transparent conductive film.

Furthermore, the liquid crystal dimming panel is a polymer dispersed liquid crystal array LCD panel.

Furthermore, the backlight module is configured to provide backlight for the liquid crystal display device, the backlight is collimated light illuminating the LCD panel.

Furthermore, a third brightness viewing angle of the LCD panel of the liquid crystal display device is less than 10 angles.

Furthermore, the a third brightness viewing angle of the LCD panel of the liquid crystal display device is one among 2 angles, 4 angles, 6 angles, and 8 angles.

Furthermore, the backlight module comprises a plurality of luminous points corresponding to each of the image pixels in the LCD panel one to one, such that the collimated light emitted from the plurality of luminous points in the backlight module is enabled to irradiate on the corresponding image pixels in the LCD panel centralizedly; or, the backlight module is a luminous point that emits collimated light toward the plurality of image pixels of the LCD panel.

Furthermore, the luminous point of the backlight module is one or more combination of a bulb, an LED, a cold cathode fluorescent tube, a hot cathode fluorescent lamp, an emitting diode, an organic emitting diode, and a flat fluorescent lamp.

Furthermore, each luminous point of the backlight module is provided with a light converging element configured to converge light irradiated by the luminous point into the collimated light.

Furthermore, the light converging element is a condensing lens or an optical film configured for converging light.

Furthermore, the liquid crystal display device further comprises a signal modem configured for modulating or demodulating picture signals received by the liquid crystal display device, and a controller electrically connected with the signal modem, the controller is configured for controlling the driving voltages of the image pixels of the LCD panel and the driving voltages of the dimming pixels of the liquid crystal dimming panel according to the signals modulated or demodulated by the signal modem.

Furthermore, the liquid crystal display device further comprises a human eye tracking device electrically connected with the controller and configured for tracking and determining positions of eyes of a watcher with respect to the liquid crystal display device.

Furthermore, the human eye tracking device is a CCD location-measuring device.

Another technical solution of the present application is: a method for improving color difference of viewing angles of liquid crystal display device comprising:

providing a backlight module, a LCD panel and a liquid crystal dimming panel;

emitting backlight towards a plurality of image pixel groupings in the liquid crystal display device by the backlight module; and disposing the liquid crystal dimming panel on the liquid crystal display device, and adjusting a light energy of viewing angles among the liquid crystal molecules in the liquid crystal dimming panel appropriately by controlling driving voltages of the liquid crystal dimming panel with respect to positions of different groups of the image pixel groupings.

The method for improving color difference of viewing angles of liquid crystal display device further comprises following steps:

providing a human eye tracking device configured for tracking and determining positions of eyes of a watcher with respect to the liquid crystal display device so as to capture a moving behavior of the watcher and detect new location information of the watcher with respect to the liquid crystal display device; and controlling the driving voltages of the liquid crystal dimming panel according to the new location information in a process of adjusting the light energy of viewing angles among the liquid crystal molecules in the liquid crystal dimming panel appropriately by controlling driving voltages of the liquid crystal dimming panel with respect to positions of different groups of the image pixel groupings.

The method for improving color difference of viewing angles of liquid crystal display device further comprises following steps:

in a process of emitting backlight towards the image pixel groupings in the liquid crystal display device by the backlight module, providing a light converging element configured for converging light emitted by the backlight module into collimated light so as to emit the collimated light towards the LCD panel.

Advantageous Effects

In the method for improving color difference of viewing angles of liquid crystal display device provided by the embodiment of the present application, since the liquid crystal dimming panel is disposed on the LCD panel, by controlling the driving voltages of the liquid crystal dimming panel with respect to positions of different groups of image pixel groups so as to change arrangement states of the liquid crystal molecules in the liquid crystal dimming panel, such that the light energy of viewing angles among the liquid crystal molecules in the liquid crystal dimming panel can be adjusted appropriately, in this way, an effect that all viewing angles have homogeneous colors is implemented, and a problem that there exists color difference from different viewing angles in the liquid crystal display device adopting VA liquid crystal technology is further improved.

BRIEF DESCRIPTION OF THE DRAWINGS

FIG. 4 illustrates one schematic view of a power switch of a liquid crystal dimming panel of the liquid crystal display device provided by the present application, wherein the power switch is turned on;

DETAILED DESCRIPTION OF THE PREFERRED EMBODIMENTS

Herein, embodiments of the present application are described in detail, and examples of the embodiment are illustrated in the accompanying figures; wherein, an always unchanged reference number or similar reference numbers represent(s) identical or similar components or components having identical or similar functionalities. The embodiment described below with reference to the accompanying figures is illustrative and intended to illustrate the present application, but should not be considered as any limitation to the present application.

In the description of the present application, it needs to be understood that, directions or location relationships indicated by terms such as "length", "width", "up", "down", "front", "rear", "left", "right", "vertical", "horizontal", "top", "bottom", "inside", "outside", and so on are the directions or location relationships shown in the accompanying figures, which are only intended to describe the present application conveniently and simplify the description, but not to indicate or imply that an indicated device or component must have specific locations or be constructed and manipulated according to specific locations; therefore, these terms shouldn't be considered as any limitation to the present application.

In addition, terms "the first" and "the second" are only used in describe purposes, and should not be considered as indicating or implying any relative importance, or impliedly indicating the number of indicated technical features. As such, technical feature(s) restricted by "the first" or "the second" can explicitly or impliedly comprise one or more such technical feature(s). In the description of the present application, "a plurality of" means two or more, unless there is additional explicit and specific limitation.

In the present application, unless there is additional explicit stipulation and limitation, terms such as "mount", "connect with each other", "connect", "fix", and so on should be generalizedly interpreted, for example, "connect" can be interpreted as being fixedly connected, detachably connected, or connected integrally; "connect" can also be interpreted as being mechanically connected or electrically connected; "connect" can be further interpreted as being directly connected or indirectly connected through intermediary, or being internal communication between two components or an interaction relationship between the two components. For the one of ordinary skill in the art, the specific meanings of the aforementioned terms in the present application can be interpreted according to specific conditions.

Figure 1:
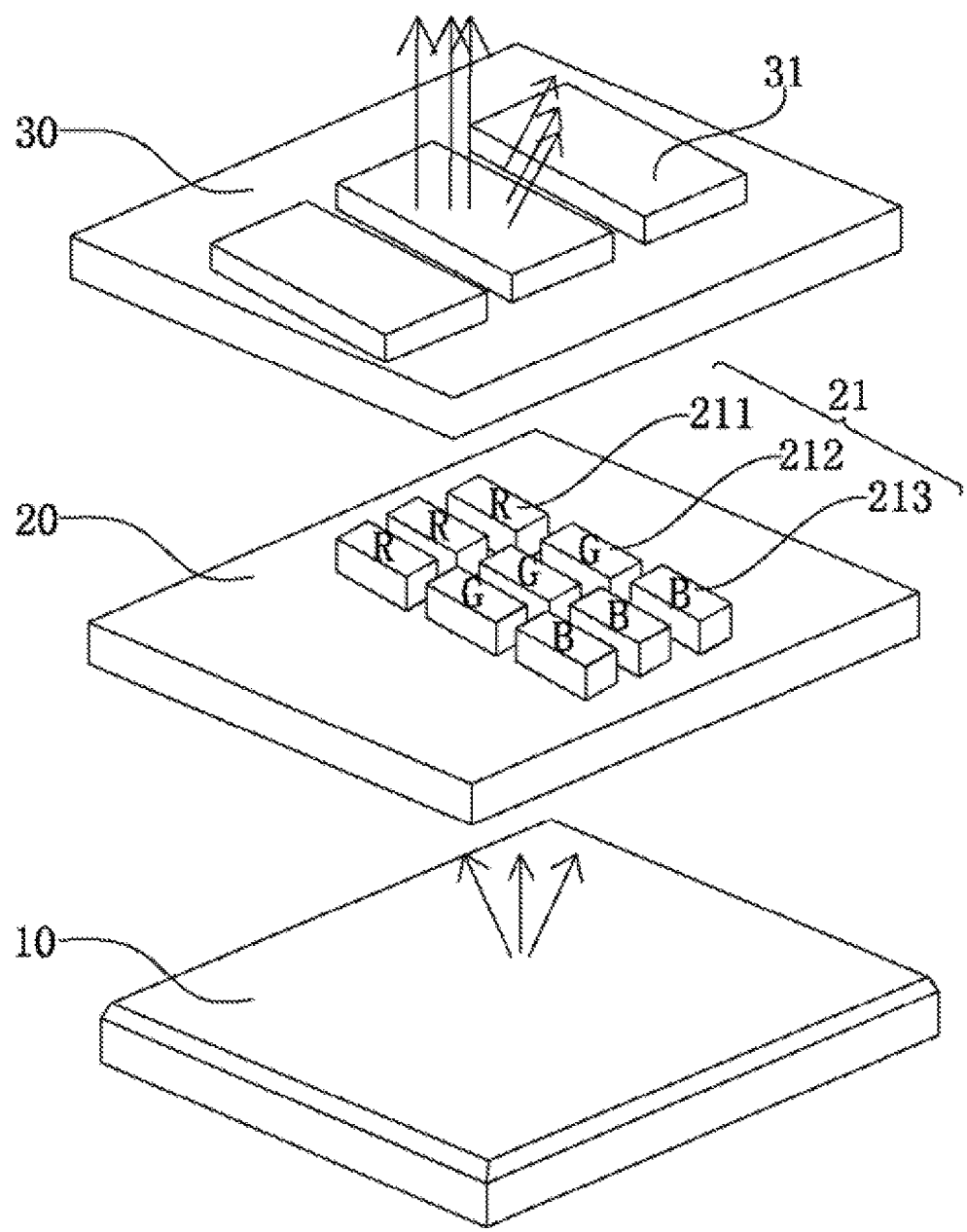
FIG. 1 illustrates a first structural exploded schematic view of a liquid crystal display device provided by an embodiment of the present application.
Figure 2:
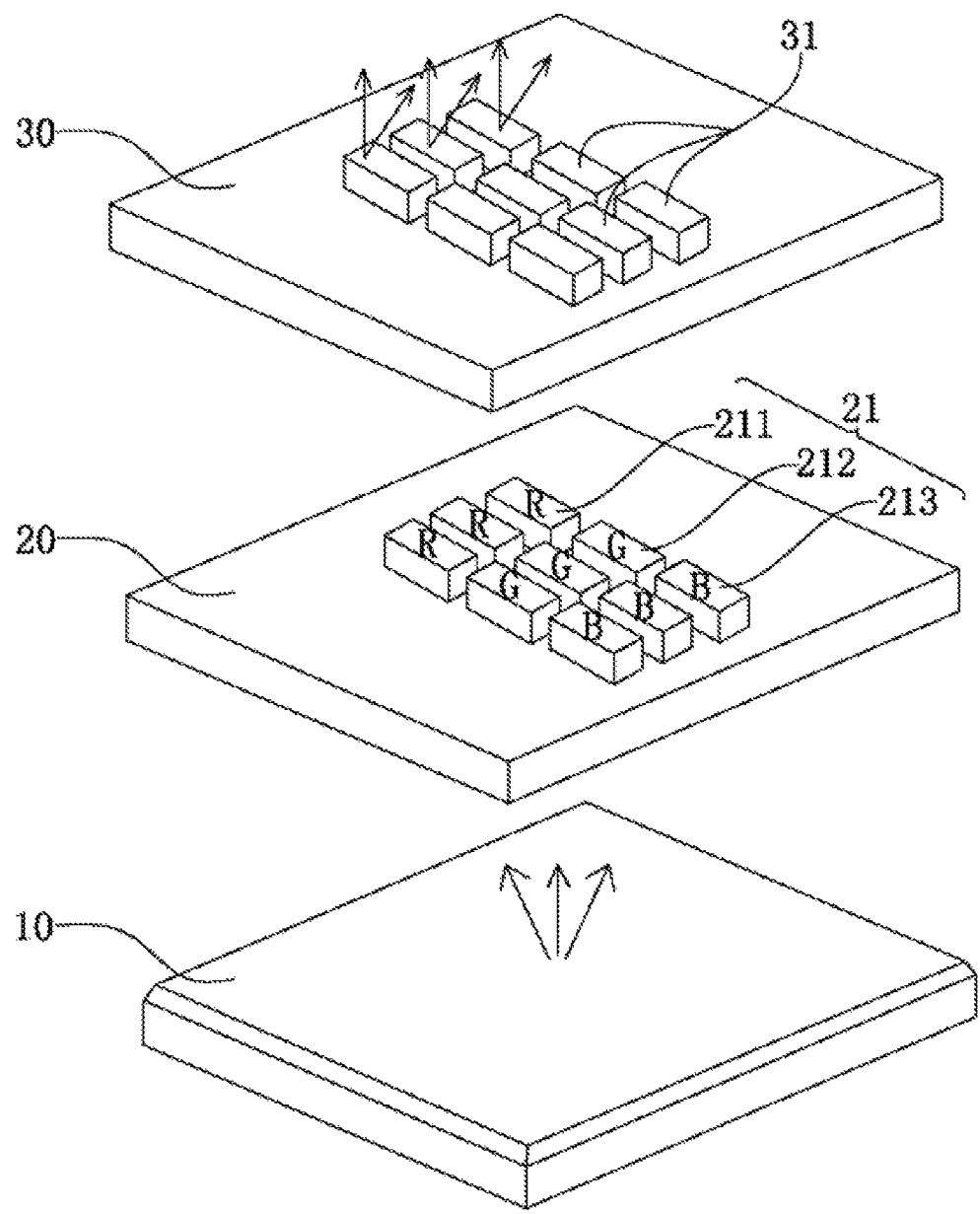
FIG. 2 illustrates a second structural exploded schematic view of the liquid crystal display device provided by the embodiment of the present application.
Figure 3:
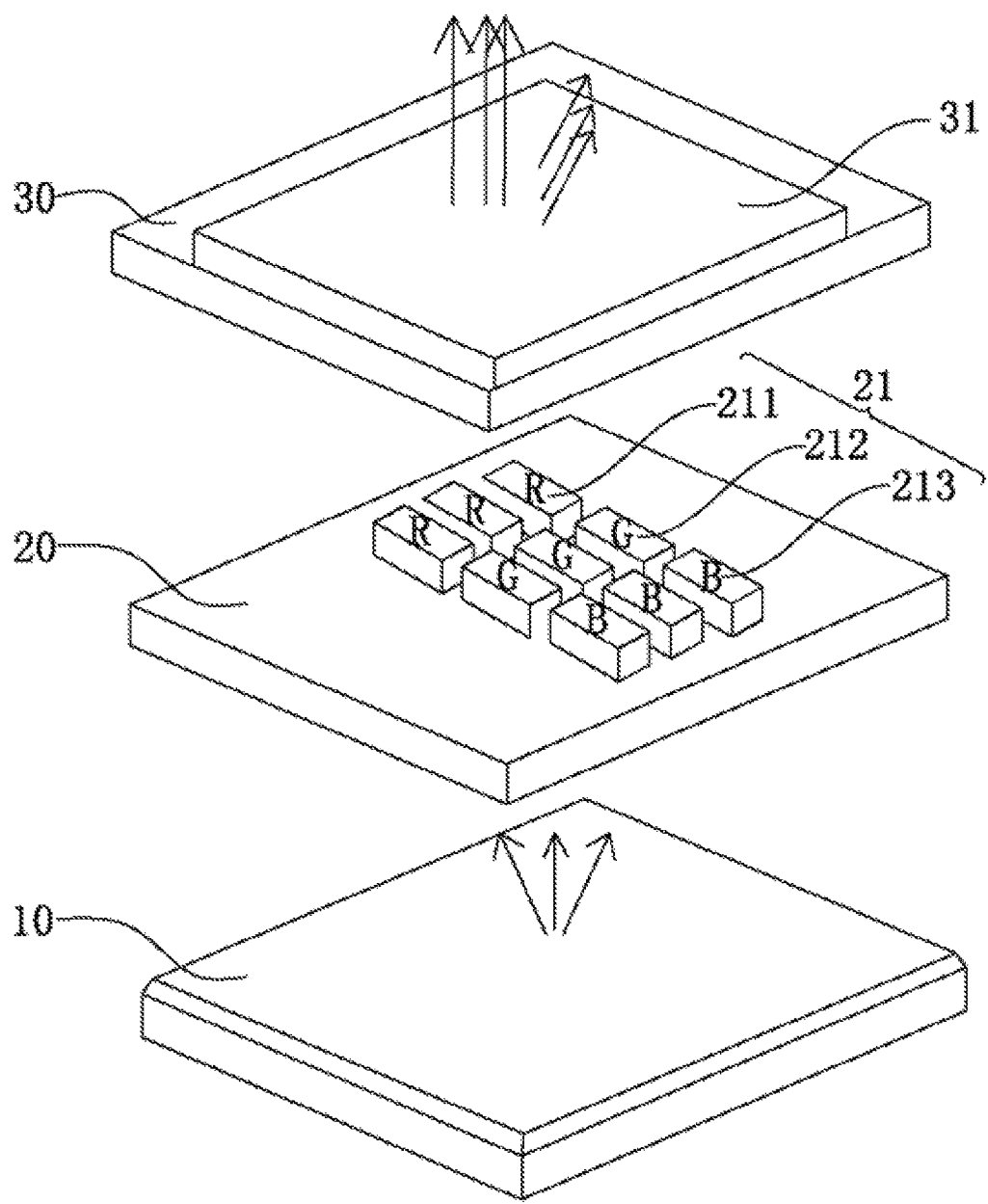
FIG. 3 illustrates a third structural exploded schematic view of the liquid crystal display device provided by the embodiment of the present application.

As shown in FIGS. 1-3, a liquid crystal display device provided by an embodiment of the present application includes a backlight module 10, a LCD (Liquid Crystal Display) panel 20, and a liquid crystal dimming panel 30. The LCD panel 20 is disposed on the backlight module 10, the LCD panel 20 is provided with groups of image pixel groupings 21 arranged in a form of an array, each group of image pixel groupings 21 comprises a plurality of image pixels. The liquid crystal dimming panel 30 is disposed on the LCD panel 20, and the LCD panel 20 is located between the backlight module 10 and the liquid crystal dimming panel 30, such that a light energy of viewing angles among liquid crystal molecules in the liquid crystal dimming panel 30 can be adjusted appropriately by controlling driving voltages of the liquid crystal dimming panel 30 with respect to positions of different groups of image pixel groupings 21.

In this embodiment, the LCD panel 20 can be a VN (Vertical Alignment) type liquid crystal display panel 20, a TN (Twisted Nematic) type liquid crystal display panel 20, or an OCB (Optically Compensated Birefringence) type liquid crystal display panel 20, or be a VA (Vertical Alignment) type liquid crystal display panel 20 without use of a compensation film polarizer, a TN type liquid crystal display panel 20 without use of the compensation film polarizer, or an OCB type liquid crystal display panel 20 without use of the compensation film polarizer, in a practice application, one of them can be selected as the liquid crystal display panel 20 of the liquid crystal display device. Of course, in some other embodiments of the present application, other type of LCD panel can also be selected as the LCD panel 20 of the liquid crystal display device, it is not the only limitation.

As shown in FIGS. 1-3, in this embodiment, each group of image pixel groupings 21 arranged in a form of an array on the LCD panel 20 can be a RGB (Red, Green, Blue) image pixel grouping 21, a WRGB (White, Red, Green, Blue) image pixel grouping 21 or a RGBY (Red, Green, Blue, Yellow) image pixel grouping 21. Of course, the image pixel groupings 21 can also be a combination of image pixels of other colors, it is not limited herein. Wherein, the RGB image pixel grouping 21 includes red image pixels 211, green image pixels 212 and blue image pixels 213. Similarly, the WRGB image pixel grouping 21 includes white image pixels, red image pixels 211, green image pixels 212 and blue image pixels 213, the RGBY image pixel grouping 21 includes red image pixels 211, green image pixels 212, blue image pixels 213 and yellow image pixels. In addition, in this embodiment, a liquid crystal pouring process applied in the LCD panel 20 is the same with the liquid crystal pouring process in the prior art.

In a using process, the backlight module 10 is used for providing backlight that illuminates towards the LCD panel 20, by controlling driving voltages of image pixel groupings 21 in different positions of the LCD panel 20 so as to change arrangement states of liquid crystal molecules in the LCD panel 20, in this way, imaging of the LCD panel 20 is implemented. However, in this embodiment, since the liquid crystal dimming panel 30 is disposed on the LCD panel 20, the arrangement states of the liquid crystal molecules in the liquid crystal dimming panel 30 can be changed by controlling driving voltages of the liquid crystal dimming panel 30 with respect to positions of different groups of image pixel groupings 21, such that the light energy of viewing angles among the liquid crystal molecules in the liquid crystal dimming panel 30 can be appropriately adjusted, an effect that colors from all viewing angles are uniform can be achieved, and a problem that there exists color difference from different viewing angles in the liquid crystal display device adopting VA liquid crystal technology can be improved, which meet the requirement of market application.

As shown in FIGS. 1-2, the liquid crystal dimming panel 30 is further provided thereon with a plurality of dimming pixels 31, the driving voltages are driving voltages of the plurality of dimming pixels 31 on the liquid crystal dimming panel 30. Wherein, each of the dimming pixels 31 on the liquid crystal dimming panel 30 can be driven individually. Moreover, by controlling a drive voltage of each of the dimming pixels 31, images displayed on the liquid crystal display device can be adjusted accurately according to different viewing angle scopes, the effect that colors from all viewing angles are uniform can be achieved, and user experiences can be improved.

In this embodiment, the liquid crystal dimming panel 30 is a PDLC (Polymer Dispersed Liquid Crystal) array liquid crystal display panel. Wherein, the PDLC is a material having an electro-optics response characteristic which is obtained by combining liquid crystal with glue with a model number of Kuer UV 65 to generate micron-sized liquid crystal microdroplets 352 distributed uniformly in a network of high-molecular polymer 351 through a polymerization reaction under certain circumstance, and then is obtained by utilizing dielectric anisotropy of liquid crystal molecules. The PDLC mainly works between a scattering state and a transparent state and has certain gray scale.

Figure 4:
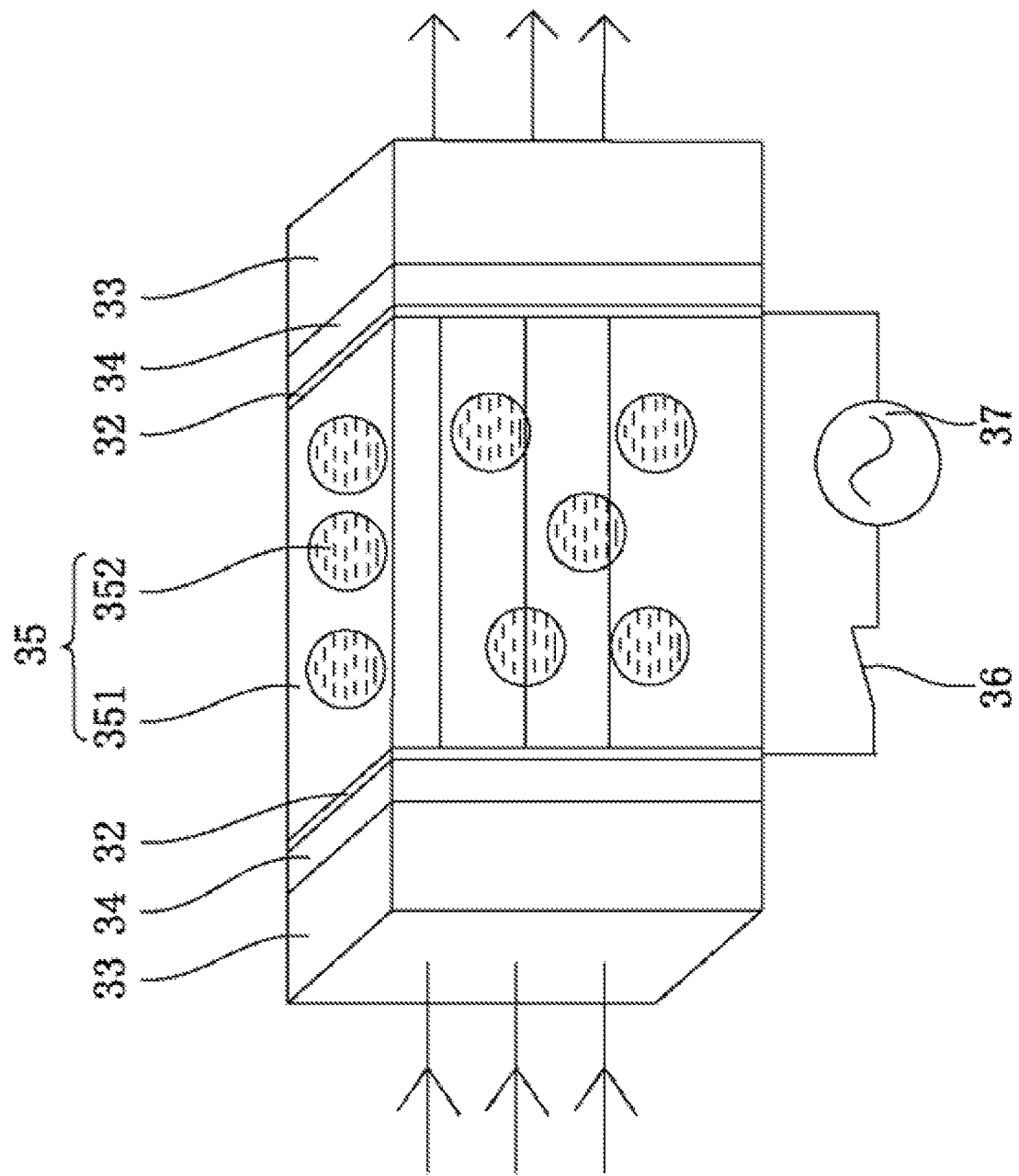

As shown in FIG. 4, when a power switch 36 of a power 37 of the PDLC is energized, an optical axis of the liquid crystal microdroplet 352 in the PDLC is configured to be perpendicular to surfaces of light-transparent conductive films and corresponds to an electric field direction. At this moment, an ordinary light refractive index of a liquid crystal microdroplet 352 matches with a refractive index of each of polymers 351 substantially, and there is no obvious medium interface between the liquid crystal microdroplet 352 and the polymers 351. A PDLC layer 35 is a basically homogeneous medium. Incident light reaches the PDLC layer 35 after penetrating a glass plate 33, an interlayer 34, and a light-transparent conductive film 32, and then are emitted out by penetrating a light-transparent conductive film 32, an interlayer 34 and a glass plate 33 on the opposite side. Wherein, the incident light never scatters in the PDLC layer 35, and emitted light of the incident light are emitted out in a direction perpendicular to the glass plate 33. Therefore, the PDLC layer 35 is in a transparent state. In this way, audiences can watch colourful images from the front side of the liquid crystal display device.

Figure 5:
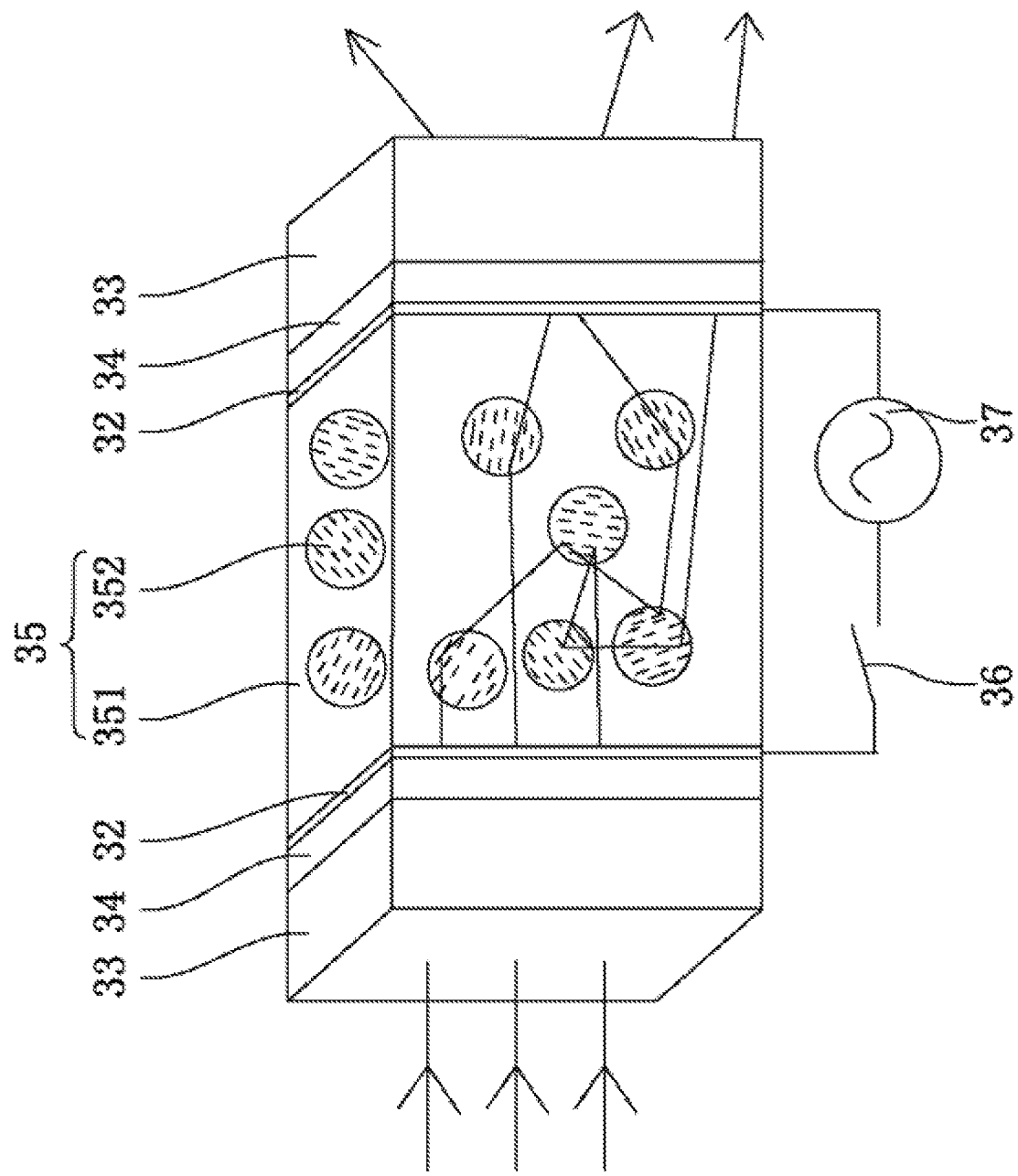
FIG. 5 illustrates another schematic view of the power switch of the liquid crystal dimming panel of the liquid crystal display device provided by the present application, wherein the power switch is turned off.

As shown in FIG. 5, when the power switch 36 of the power supply 37 of the PDLC is turned off, or value of a drive voltage for controlling the PDLC varies, the optical axis of each of the liquid crystal microdroplets 352 in the PDLC has a random direction and appears as disorder state. At this moment, an effective refractive index of each liquid crystal microdroplet 352 doesn't match with the refractive index of each polymer 351, a regular electric field can't be generated in the PDLC layer 35, and thus the incident light is scattered strongly. The incident light is reflected and refracted in various directions after penetrating the glass plate 33, the interlayer 34 and the light-transparent conductive film 32, and then are emitted out irregularly in various directions after penetrating the opposite light-transparent conductive film 32, the interlayer 34 and the glass plate 33. Therefore, the PDLC layer 35 appears as a non-transparent state or a semi-transparent state. At this moment, light energy from different viewing angles can be adjusted appropriately by the liquid crystal display device 20 according to different positions of audients, such that light energy from the front viewing angle of the liquid crystal display device 20 is assigned to large viewing angles, and it is ensured that positions where the audients locate can show images having image colors and image qualities equivalent to that of the images from the front viewing angle.

As shown in FIG. 1, furthermore, each of the dimming pixels 31 is configured to be corresponding to each of the image pixel groupings 21 one to one. According to this design, a resolution of the liquid crystal dimming panel 30 can be effectively reduced, and the number of the driving circuits and drive elements on the liquid crystal dimming panel 30 can also be reduced, and light transmittance of the liquid crystal dimming panel 30 can be increased. Of course, as shown in FIG. 3, each of the dimming pixels 31 can also be corresponding to several adjacent image pixel groupings 21. It needs to be further illustrated that, this pixel design fits for a situation that dimensions of local areas of the dimming pixels 31 are large enough that even human eyes can't identify chromaticity inhomogeneity among different local areas of the dimming pixels 31.

As shown in FIG. 2, furthermore, each of the dimming pixels 31 is corresponding to each of the image pixels in the corresponding image pixel grouping 21 one to one. At this moment, the dimming pixels 31 of the liquid crystal dimming panel 30 corresponding to each of the image pixels on the LCD panel 20 one to one can be controlled individually to be driven, in this way, color presentation of positions of different color blocks on the LCD panel 20 can be compensated appropriately. Moreover, the positions of different color blocks on the LCD panel 20 can also have a capability of particularly enhancing a local-regional hue presentation, thereby emphasizing on a presentation of high saturated hue.

As shown in FIG. 4 and FIG. 5, furthermore, each of the two opposite surfaces of the liquid crystal dimming panel 30 is provided with a light-transparent conductive film 32 respectively, and driving voltages of the liquid crystal dimming panel 30 with respect to positions of different groups of the image pixel groupings 21 are controlled according to wiring of the light-transparent conductive film 32, such that an appropriate adjustment of light energy of viewing angles among the liquid crystal molecules in the liquid crystal dimming panel 30 can be implemented. Wherein, the light-transparent conductive film 32 can be a metal light-transparent conductive film 32 such as Ag, Pt, Cu, Rh, and so on, or be an oxide of In, Sn, Zn and Cd, and a multiple complex oxide light-transparent conductive film of the oxide. Preferably, the light-transparent conductive film is an ITO (Indium Tin Oxides) light-transparent conductive film having excellent light transmittance and conductivity.

Furthermore, the backlight module 10 in the present application is configured for providing backlight for the LCD panel 20, the backlight is collimated light that irradiates towards the LCD panel 20. Preferably, in this embodiment of the present application, a third brightness viewing angle of the LCD panel 30 of the liquid crystal display device is less than 10 degrees. For example, the a third brightness viewing angle of the LCD panel 30 of the liquid crystal display device can be one among 2 degrees, 4 degrees, 6 degrees and 8 degrees. According to this design, it can be ensured that light emitted by the backlight module 10 can still maintain at positive light energy after penetrating the LCD panel 20, such that light energy can be distributed effectively and reasonably, and a purpose of power saving and electricity saving can be achieved. Wherein, the one third brightness viewing angle is the viewing angle in a horizontal direction or a vertical direction when a brightness of a center of the screen is reduced to one third of its maximum brightness.

In this embodiment, the backlight module 10 can include one or a plurality of luminous points. Preferably, when the backlight module 10 includes a plurality of luminous points, the plurality of luminous points are corresponding to each of the image pixels in the LCD panel 20 one to one, in this way, collimated light emitted by the plurality of luminous points in the backlight module 10 can illuminate towards the corresponding image pixels in the LCD panel 20 centralizedly, so that light emitted out from the LCD panel 20 can maintain at positive light energy, an optical efficiency can be improved, and a purpose of taking advantage of light energy effectively can be achieved.

Specifically, the luminous point of the backlight module 10 can be one or more combination of a bulb, a light emitting diode, a CCFT (Cold Cathode Fluorescent Tube), a HCFL (Hot Cathode Fluorescent Lamp), an emitting diode, an organic emitting diode and a flat fluorescent lamp. Of course, in other embodiment of the present application, other type of luminescent source can also be selected as the luminous point of the backlight module 10, it is not solely limited herein. In addition, in this embodiment, each luminous point of the backlight module 10 can be provided with a corresponding light converging element, the light converging element can be a condensing lens, or an optical film for converging light, or the like. In this situation, the luminous point of the backlight module 10 can be selected to be an ordinary luminescent source that scatters light, the scattered light emitted by the luminescent source is converged into collimated light after penetrating the light converging element, and then illuminates on the LCD panel 20.

Furthermore, the liquid crystal display device further includes an information modem (not shown in the figures) configured to modulate or demodulate picture signal received by the liquid crystal display device, and a controller (not shown in the figures) electrically connected with the information modem, the controller is configured to control driving voltages of the image pixels of the LCD panel 20 and driving voltages of the dimming pixels of the liquid crystal dimming panel 30 according to signals modulated or demodulated by the information modem. When the liquid crystal display device receives picture signal, the picture signal is modulated or demodulated by the information modem, afterwards, the modulated or demodulated signal is further transmitted to the controller, an imaging of the LCD panel 20 is controlled by the controller according to the modulated or demodulated signal, and the liquid crystal dimming panel 30 is controlled by the controller simultaneously so that image colors watched from different viewing angles is adjusted appropriately, thereby eliminating a problem that there exists color difference from different viewing angles of the liquid crystal display device, in this way, a watcher located at positions of different viewing angles can obtain an imaging effect equivalent to that from the front viewing angle.

Furthermore, the liquid crystal display device further includes a human eye tracking device (not shown in the figures) electrically connected with the controller and configured for tracking and determining a position of the watcher with respect to the liquid crystal display device. When the position of the watcher with respect to the liquid crystal display device is changed, the human eye tracking device can capture a moving behavior of the watcher immediately and detect new position information of the watcher with respect to the liquid crystal display device. Afterwards, the human eye tracking device further transmits the new position information of the watcher with respect to the liquid crystal display device to the controller, the controller controls the drive voltage of the liquid crystal dimming panel 30 according to the new position information and regulate a proportion of the scattered liquid crystal that scatters and light transmittance of the polymers 351 in the liquid crystal dimming panel 30 in real time, different levels of light energy compensation amount are provided according to different viewing angles, such that an imaging quality after the watcher's position is changed can be improved, a display effect that there is no color difference from positions of all viewing angles can be implemented.

Furthermore, the human eye tracking device is a CCD (Charge Coupled Device) position-measuring device. The CCD is also referred to as an image controller or CCD image sensor. Wherein, the CCD position-measuring device has advantages including a high resolution, a high sensitivity, a broad dynamic range, a low degree of image distortion, and a big photosensitive area. Of course, according to the actual condition and the requirement, in some other embodiment of the present application, the human eye tracking device can also be any other device that can implement functions of tracking and locating, it is not solely restricted herein.

The embodiment of the present application further provides a method for improving color difference of viewing angles of a liquid crystal display device including:

providing a backlight module 10, a LCD panel 20 and a liquid crystal dimming panel 30;

emitting backlight towards image pixel groupings 21 in the liquid crystal display device 20 by the backlight module 10; and disposing the liquid crystal dimming panel 30 on the LCD panel 20, and adjusting a light energy of viewing angles among liquid crystal molecules in the liquid crystal dimming panel 30 appropriately by controlling driving voltages of the liquid crystal dimming panel 30 with respect to positions of different groups of the image pixel groupings 21.

In the method for improving color difference of viewing angles of the liquid crystal display device provided by the embodiment of the present application, since the liquid crystal dimming panel 30 is disposed on the LCD panel 20, arrangement states of the liquid crystal molecules in the liquid crystal dimming panel 30 are changed by controlling driving voltages of the liquid crystal dimming panel 30 with respect to positions of different groups of image pixel groups 21, such that the light energy of viewing angles among the liquid crystal molecules in the liquid crystal dimming panel 30 can be adjusted appropriately, and thus an effect that all viewing angles have homogeneous colors is implemented, a problem that there exists color difference from different viewing angles in the liquid crystal display device adopting VA liquid crystal technology is improved, which meets the need of the market.

In the method for improving color difference of viewing angles of the liquid crystal display device, by providing the human eye tracking device configured to track and determine positions of eyes of the watcher with respect to the liquid crystal display device, the moving behavior of the watcher can be captured, and new position information of the watcher with respect to the liquid crystal display device can be detected. Afterwards, in a process of adjusting light energy of viewing angles appropriately among liquid crystal molecules in the liquid crystal dimming panel 30 appropriately by controlling the driving voltages of the liquid crystal dimming panel 30 with respect to positions of different groups of image pixel groupings 21, the drive voltage of the liquid crystal dimming panel 30 is controlled according to the new position information. In this way, the drive voltage applied to the liquid crystal dimming panel 30 can be adjusted in real time according to the current position of the watcher with respect to the LCD panel 20, and thus an effect that the watcher can always watch colorful image pictures is implemented.

Preferably, in a process of using the backlight module 10 to emit backlight towards the image pixel groupings 21 of the LCD panel 20, a light converging element configured to converge light emitted by the backlight module 10 into collimated light is provided, thereby implementing emitting collimated light towards the LCD panel 20. In this way, light energy of backlight that illuminates towards the LCD panel 20 is enough, so that the light energy of backlight that is required in an imaging process of the LCD panel 20 is satisfied, qualities of image pictures are ensured.

It needs to be further illustrated that, each of directions indicated by the arrows shown in FIGS. 1-5 is a light irradiation direction.

As stated above, it is obvious that the present application has the aforesaid excellent features, such that the present application increases efficiencies not included in the prior art and possesses practicability in use, and thus become a product having great practical value.

The aforementioned embodiments are only preferred embodiments of the present application, and are not used for limiting the present application. Any modification, equivalent replacement, improvement, and so on, which are made within the spirit and the principle of the present application, should be included in the protection scope of the present application.

The invention claimed is:

1. A liquid crystal display device comprising:
a backlight module;
a LCD panel disposed on the backlight module, wherein the LCD panel is provided with a plurality of groups of image pixel groupings arranged in a form of an array, and each group of the image pixel groupings comprises a plurality of image pixels;
a liquid crystal dimming panel disposed on the LCD panel, wherein the liquid crystal dimming panel is provided with a plurality of dimming pixels, the LCD panel is positioned between the backlight module and the liquid crystal dimming panel, and a light energy of viewing angles among the liquid crystal molecules in the liquid crystal dimming panel is adjusted appropriately by controlling driving voltages of the liquid crystal dimming panel with respect to positions of different groups of the image pixel groupings;
a signal modem, configured for modulating or demodulating picture signals received by the liquid crystal display device;
a controller electrically connected with the signal modem, configured for controlling the driving voltages of the image pixels of the LCD panel and the driving voltages of the dimming pixels of the liquid crystal dimming panel according to the signals modulated or demodulated by the signal modem; and
a human eye tracking device electrically connected with the controller, configured for tracking and determining positions of eyes of a watcher with respect to the liquid crystal display device so as to capture a moving behavior of the watcher and detect new location information of the watcher with respect to the liquid crystal display device, wherein the driving voltages of the liquid crystal dimming panel according to the new location information in a process of adjusting light energy of viewing angles among the liquid crystal molecules in the liquid crystal dimming panel appropriately is controlled by controlling driving voltages of the liquid crystal dimming panel with respect to positions of different groups of the image pixel groupings.

2. The liquid crystal display device according to claim 1, wherein each of the dimming pixels is corresponding to each of the image pixel groupings on the liquid crystal display panel one to one.

3. The liquid crystal display device according to claim 1, wherein each of the dimming pixels is corresponding to each of the image pixels in each image pixel grouping one to one.

4. The liquid crystal display device according to claim 1, wherein each of the dimming pixels is corresponding to some of the image pixel groupings on the LCD panel.

5. The liquid crystal display device according to claim 1, wherein each of two opposite surfaces of the liquid crystal dimming panel is provided with a light-transparent conductive film, and the light energy of viewing angles among the liquid crystal molecules in the liquid crystal dimming panel is adjusted appropriately by controlling the driving voltages of the liquid crystal dimming panel with respect to the positions of different groups of the image pixel groupings according to wiring of the light-transparent conductive film.

6. The liquid crystal display device according to claim 1, wherein the liquid crystal dimming panel is a polymer dispersed liquid crystal array LCD panel.

7. The liquid crystal display device according to claim 1, wherein the backlight module is configured to provide a backlight for the liquid crystal display device, the backlight is collimated light illuminating the LCD panel.

8. The liquid crystal display device according to claim 7, wherein a third brightness viewing angle of the LCD panel of the liquid crystal display device is less than 10 angles.

9. The liquid crystal display device according to claim 8, wherein the third brightness viewing angle of the LCD panel of the liquid crystal display device is one among 2 angles, 4 angles, 6 angles, and 8 angles.

10. The liquid crystal display device according to claim 7, wherein the backlight module comprises a plurality of luminous points corresponding to each of the image pixels in the LCD panel one to one, such that the collimated light emitted from the plurality of luminous points in the backlight module is enabled to irradiate on the corresponding image pixels in the LCD panel centralizedly; or, the backlight module is a luminous point that emits collimated light toward the plurality of image pixels of the LCD panel.

11. The liquid crystal display device according to claim 10, wherein the luminous point of the backlight module is one or more combination of a bulb, an LED, a cold cathode fluorescent tube, a hot cathode fluorescent lamp, an emitting diode, an organic emitting diode, and a flat fluorescent lamp.

12. The liquid crystal display device according to claim 11, wherein each luminous point of the backlight module is provided with a light converging element configured to converge light irradiated by the luminous point into the collimated light.

13. The liquid crystal display device according to claim 12, wherein the light converging element is a condensing lens or an optical film configured for converging light.

14. The liquid crystal display device according to claim 1, wherein the human eye tracking device is a CCD location-measuring device.

15. A method for improving color difference of viewing angles of liquid crystal display device comprising:
  providing a backlight module, a LCD panel and a liquid crystal dimming panel;
  emitting backlight towards a plurality of image pixel groupings in the liquid crystal display device by the backlight module;
  disposing the liquid crystal dimming panel on the liquid crystal display device, and adjusting a light energy of viewing angles among the liquid crystal molecules in the liquid crystal dimming panel appropriately by controlling driving voltages of the liquid crystal dimming panel with respect to positions of different groups of the image pixel groupings;
  wherein the method further comprises:
  providing a human eye tracking device configured for tracking and determining positions of eyes of a watcher with respect to the liquid crystal display device so as to capture a moving behavior of the watcher and detect new location information of the watcher with respect to the liquid crystal display device; and
  controlling the driving voltages of the liquid crystal dimming panel according to the new location information in a process of adjusting light energy of viewing angles among the liquid crystal molecules in the liquid crystal dimming panel appropriately by controlling driving voltages of the liquid crystal dimming panel with respect to positions of different groups of the image pixel groupings.

16. The method for improving color difference of viewing angles of liquid crystal display device according to claim 15, further comprising following steps:
  in a process of emitting backlight towards the image pixel groupings in the liquid crystal display device by the backlight module, providing a light converging element configured for converging light emitted by the backlight module into collimated light so as to emit the collimated light towards the LCD panel.

* * * * *